United States Patent
Carlson et al.

(10) Patent No.: US 10,482,290 B1
(45) Date of Patent: Nov. 19, 2019

(54) VIRTUAL POLYMORPHIC HARDWARE ENGINE

(71) Applicant: Cipherloc Corporation, Buda, TX (US)

(72) Inventors: Albert Henry Carlson, Buda, TX (US); Robert LeBlanc, Buda, TX (US)

(73) Assignee: Cipherloc Corporation, Buda, TX (US)

( * ) Notice: Subject to any disclaimer, the term of this patent is extended or adjusted under 35 U.S.C. 154(b) by 0 days.

(21) Appl. No.: 16/193,424

(22) Filed: Nov. 16, 2018

Related U.S. Application Data

(62) Division of application No. 15/206,483, filed on Jul. 11, 2016, now Pat. No. 10,162,985.

(51) Int. Cl.
*G06F 21/72* (2013.01)
*G06F 21/75* (2013.01)

(52) U.S. Cl.
CPC .................. *G06F 21/75* (2013.01)

(58) Field of Classification Search
USPC ........ 713/189, 150, 163, 181; 726/2, 21, 36; 380/255, 264, 276
See application file for complete search history.

(56) References Cited

U.S. PATENT DOCUMENTS

| | | | |
|---|---|---|---|
| 2013/0173970 A1* | 7/2013 | Kleveland | G11C 29/44 714/710 |
| 2015/0019803 A1* | 1/2015 | Miller | G06F 3/0611 711/105 |
| 2016/0011801 A1* | 1/2016 | Goldberg | G06F 3/0619 711/103 |
| 2017/0090935 A1* | 3/2017 | Falsafi | G06F 12/0862 |

* cited by examiner

*Primary Examiner* — Sharif E Ullah
(74) *Attorney, Agent, or Firm* — Richard L. Moseley

(57) ABSTRACT

Virtual field programmable gate array (VFPGA) duplicates and/or emulates a field programmable gate array through the use of base hardware and firmware that uses RAM as ROM or EPROM and provides control and monitoring and manipulation through the use of elementary and basic device functionality commands (machine code primitives) to accommodate the needs of polymorphic cipher engine software so that the software achieves the same results as thou it had access to programmable logic arrays, gate and logic blocks found in field programmable gate array chips.

2 Claims, 7 Drawing Sheets

(No Data Transmitted
During Code Changes)

VIRTUAL POLYMORPHIC HARDWARE ENGINE

BACKGROUND OF THE INVENTION

Digital computer systems are at the very heart of today's modern lifestyle. Protecting those computers from successful attacks that disrupt communications, alter/access data, or issue false commands/data is critical because:

1. Successful attacks on their communications hampers the ability of these systems to react to changing conditions. This could affect useful reaction time and might prevent the system from altering its' operation in time to prevent a service outage or damage to the equipment.

2. Altering and accessing data allows the system to react correctly but changes the situation to one which should not exist or simply supplies the intruder with sensitive information.

3. Issuing false commands tells the system to alter its state to react the wrong way, potentially resulting in damage to the system or, loss of service or loss of life.

Hackers have developed many effective methods known as "attacks" that disrupt communications, alter/access data or issue false commands/data of modern digital computer systems. As an example, one type of attack that issues false commands is the "replay" attack in which a hacker records commands sent by the network and then replays it on the network. This attack is very effective because the hacker does not have to decrypt the message; he merely observes the effect of the traffic. Replay attacks can be used over and over until the system rejects those messages.

The present invention presents successful, single defensive countermeasure that can address all of these attributes—polymorphism, or "mutating", which is the ability to change (perhaps an encryption to another method of encryption or key or maybe even hardware functionality) on the fly. Polymorphism has two components which when combined make up what the inventors herein call CipherLoc®. The two components are (1) a polymorphic cipher engine (the software) and
(2) a polymorphic hardware engine.

The polymorphic cipher engine and the polymorphic hardware engine platforms are designed to work together but are mutually exclusive of each other and can be used separately in a multitude of divergent ways.

The present invention is directed to the second component—the polymorphic hardware engine.

SUMMARY OF THE INVENTION

The present invention literally changes the operational characteristics of the hardware upon which the polymorphic cipher engine runs. The concept is specifically applied to hardware, specifically computers themselves and in particular some of the chips that comprise the motherboard and peripheral support infrastructure.

Certain types of support chips, called field programmable gate arrays (FPGA's), have the ability to be reconfigured while operating. The FPGA use and arrangement for this application is disclosed in U.S. Pat. No. 9,178,514 which is herein incorporated by reference.

Due to FPGA cost and complexity of implementation, dynamic duplication/emulation, or virtualization, of the functionality of an FPGA (VFPGA) by a non-FPGA chip/set (NFPGA) can be achieved utilizing firm ware in a chip that is a multipurpose, clock driven, register based, programmable electronic device which accepts digital or binary data as input, processes it according to instructions stored in its memory or associated directly addressable memory, and provides results as output would be highly desirable and essential for many applications.

Firmware is a type of software that provides control, monitoring and data manipulation of engineered products and systems. Firmware is usually held in non-volatile memory devices such as read only memory (ROM), erasable programmable read only memory (EPROM), or flash memory. An FPGA can be emulated by use of firmware on random access memory utilized (RAM) as the ROM or EPROM.

Virtual field programmable gate array (VFPGA) duplicates and/or emulates a field programmable gate array through the use of base hardware and firmware that uses RAM as ROM or EPROM and provides control and monitoring and manipulation through the use of elementary and basic device functionality commands (machine code primitives) to accommodate the needs of polymorphic cipher engine software so that the software achieves the same results as though it had access to programmable logic arrays, gate and logic blocks found in field programmable gate array chips.

DETAILED DESCRIPTION OF THE PREFERRED EMBODIMENT

Figure 1:
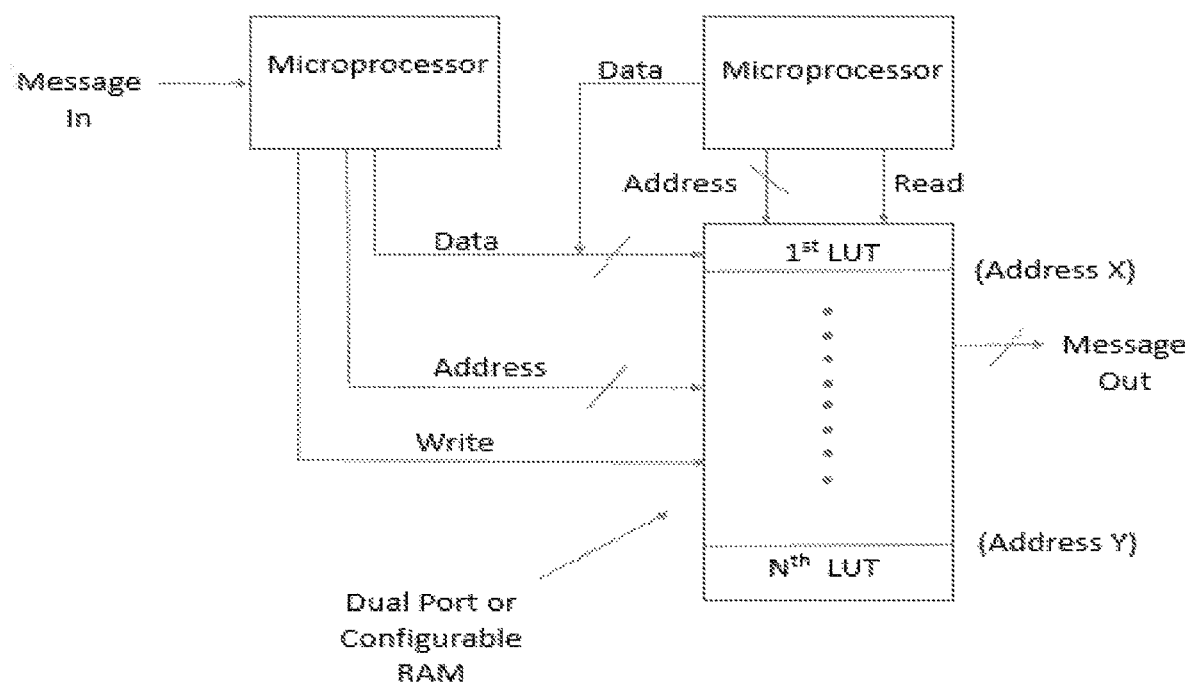
FIG. 1 is a diagram of configurable memory as composed of individual streams.

Virtual field programmable gate array function (VFPGA) on a non-field programmable gate array (NFPGA) chip/set, requires that the configurable memory as being composed of individual streams and the diagram looks like that shown in FIG. 1.

Following the principles laid out in M. E. Van Valkenburg's "Network Design", $3^{rd}$ edition, the VFPGA achieves all FPGA functionality necessary to support the CPCE by way of a transfer function. The transfer function is created by partitioning and loading memory as if it were a Temporally Constrained State Based Machine, as described by Eleftherakis, Hinchey and Holcombe in their 2012 research publication "Software Engineering and Formal Methods" (presented at the $10^{th}$ International Conference, SEFM 2012, Thessaloniki, Greece, October 2012 Proceedings), so that in conjunction with one or more microprocessors having one or more cores and one or more memories and either internal or external memory it produces the same effect as an FPGA. By using a non-persisted memory mapping function, so that when the process has finished working the data is lost, the shared memory created is useful for inter-process communications (IPC) in the form of a Lookup table (LUT). This simulates the transfer function of a circuit within an FPGA by partitioning sufficiently large enough memory into different blocks corresponding to different circuits represented by the transfer function in a portion of the memory. Indexing to the memory addresses and using the contiguous memory for a LUT corresponds to loading an FPGA and its' internal fabric configuration as if it were a new circuit.

H. S. Black, in his "Modulation Theory", Vol. 65, 1953, says that any message can be decomposed into a set of wave forms representing the information in that message. Similarly, any analog wave form that contains information or even response to external stimuli can be represented in the same manner, for example AM and FM radio transmissions. Nyquist teaches us via the Nyquist criteria, Bell Laboratories 1932, that any analog signal can be represented by a discrete signal such that the frequency of the discrete signal $$f_d \geq 2f_a$$

in which $f_d$ is the frequency of the digital equivalent signal and $f_a$ is the highest frequency of the analog signal.

Further, Nyquist instructs us that the equivalence will be more exact for a higher sampling rate. His recommendation was a sampling rate of $10f_a$, but, the representation of the signal will be more accurate as the multiplier increases towards the limit of infinity (∞). Therefore, it is possible to represent either signal in either digital or analog form.

Figure 2:
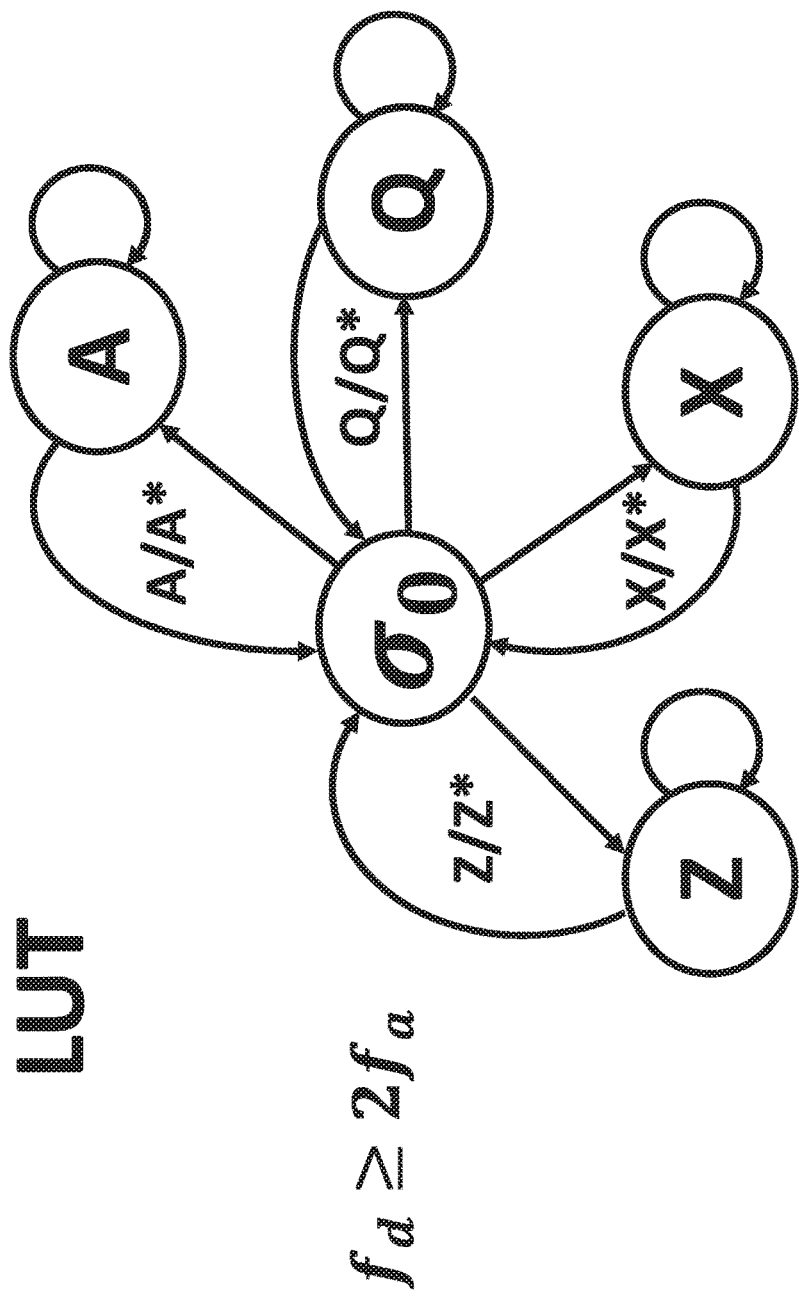
FIG. 2 is a graphic depiction of a finite state machine.

Messages can be viewed as a sequence of sub-messages further composed of individual blocks and/or symbols. Each symbol is represented by some digital encoding such as ASCII or Unicode. The progression of each similar block comprises a sequence of digital signals that can be represented/implemented by a Finite State Machine (FSM) as illustrated in FIG. 2.

The Finite State Machine, representing the sub-message, consists of independent sequences that can be applied serially from a base state via an IPC in the form of a LUT in the FSM. The input to the FSM is the plain text symbol or block and the output is the encrypted cipher text for transmission.

Because the FSM represents only a sub-message (portion) of the message, the FSM is valid for only a portion of the message cycle. It must be replaced with a new FSM for the next sequential sub-message portion of the message. Each FSM is non-persistent because it is regularly replaced with a new FSM representing the next sub-message in the message stream. Further, the operation of the FSM can be represented by RAM acting as ROM or a circuit. Each state is encoded at a separate address, sequentially/non-sequentially stored in memory, and serially accessed by some addressing scheme. In this manner, memory acts as if it were a hardware implementation of a circuit by encoding the results of that circuit's transfer function.

Figure 3:
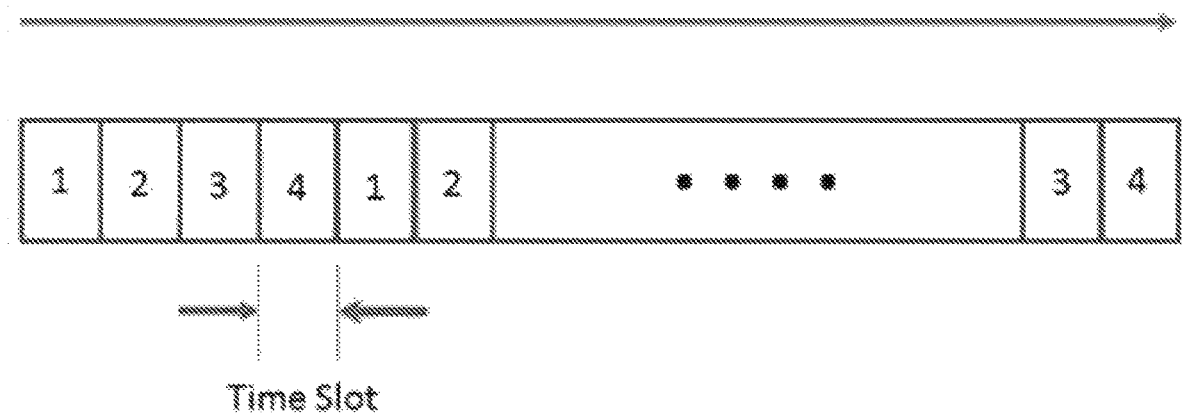
FIG. 3 is a graphic depiction of Linear Reconfiguration.

By doing this, the VFPGA can support the concept known as Linear Reconfiguration (LR) as illustrated in FIG. 3, in a Finite State Machine, which is the practice of changing the configuration of something each time period as is described in U.S. Pat. No. 9,178,514 which is herein incorporated by reference. When using a Polymorphic Key Progression Algorithm (PKPA), the latency encountered during the change is a major drawback.

Figure 4:
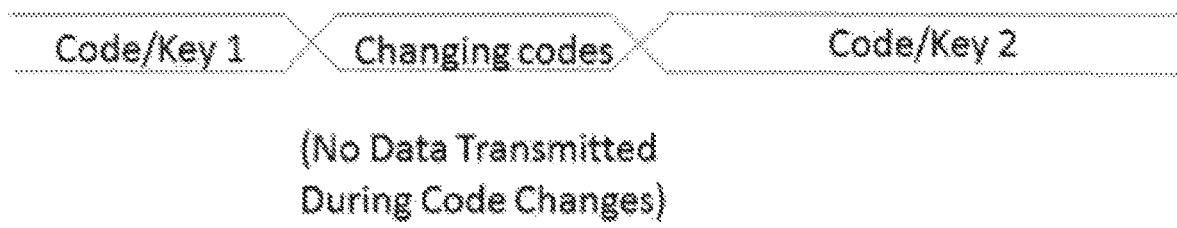
FIG. 4 is a graphic depiction of a single stream cipher with changing code key.

Ideally, the next cipher/key combination would be synchronizing with the data stream while the present cipher/key combination is active. At the end of that period the encryption would immediately change to the next cipher/key data stream as illustrated in FIG. 4.

If this transition is noted and seen by a hacker, they would know how long a section of code has the same key and cipher, making it much easier to break and it slows down the transmission of data.

Figure 5:
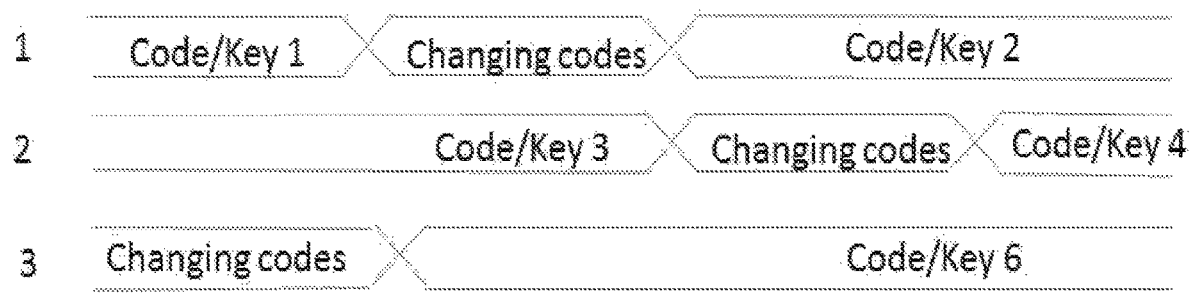
FIG. 5 is a graphic depiction of multiple stream ciphers with changing code keys.

Eliminating this latency overhead is very important. When implemented correctly, there would be several lines working simultaneously that were offset from each other by the correct amount of time. Each stream of data would be chosen one at a time, in sequence. In the VFPGA, this type of hardware multiplexing is provided. For example, assume that there are three different streams of encryption as shown in the FIG. 5.

Each of the cipher changes takes place when one of the others is stable. Assuming that the ciphers are applied until the change of ciphers takes place on that stream, the output then changes to the next cipher/key pair in the next stream. The changes take place by the address with each block of memory sequentially selected. Changes can take place in less than a single character so there is no latency seen at the output and overhead takes place when a stream is not active.

If the sector consisting of code and cipher streams were a VFPGA hardware implementation in a single NFPGA, each cipher/key stream could be implemented in one reconfigurable sector. This has the same effect as shown for LR streams with no overhead and latency. Each sector is configured and in its turn is used as the stream for data, and then reconfigured when done in order to resynchronize for its next time slot of service. In this way one (1) or more processors with one (1) or more cores and configurable/dual-port memory can be used to achieve a mutating cipher. While it is possible to use uniform sized blocks of memory to implement LUTs, it is also desirable to be able to vary the block size, depending on the amount of data to be placed in the LUT. In this manner, memory can be more efficiently used by only using the necessary size memory block to implement the LUT. The designer need not find the largest block and then make every memory block that size. Dynamic partitioning of the memory based on the information content of the sub-message memory can then be used for efficiency.

Note:
1. Such a design methodology can also be used in other circumstances. Any function, whether randomly changing or changing as a function of some deterministic system, can be similarly implemented and reconfigured as needed.
2. As hardware improves, this type of design gets stronger and more responsive.

Figure 6:
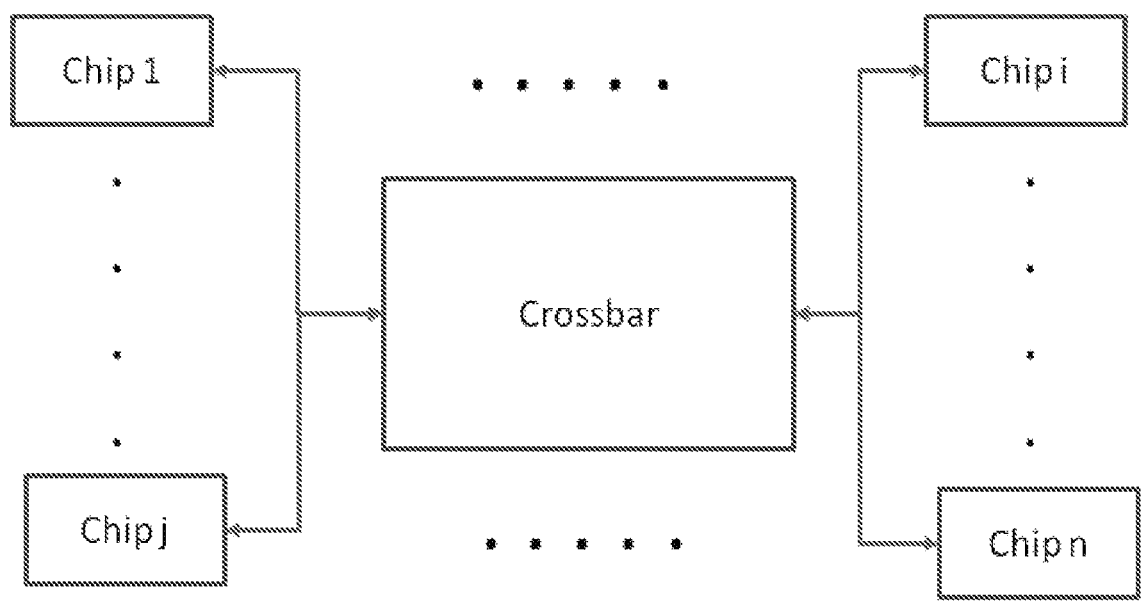
FIG. 6 is a diagram of several chips connected together in a circuit through a crossbar.

VFPGA on a NFPGA chip/set also supports the concept of Dynamic Pin Reassignment (DPR), a Finite State Machine, as is described in U.S. Pat. No. 9,178,514 B1 and is incorporated by reference, which is the dynamic assignment of input and output signals to buses that lead to central signal distribution points: as illustrated in FIG. 6.

In DPR each chip routes its input and output) I/O to the crossbar. Data about the source or destination of signals is kept at the crossbar, based on knowledge of the key that is shared between the crossbar and the chips.

For each chip, there are five sets of information that are managed by the circuit. These sets are:
1. {$Fctn_{in}$|Function pins into the chip},
2. {$Fctn_{out}$|Function pins out of the chip},
3. {$Map_{ci,co,fctn}$|ci=input chip, co=output chip, fctn=pin function},
4. {Random|one line to each chip}, and
5. {Nulls|each null line is a cryptonull}.

The I/O count for each chip, i, is denoted by $IO_i$. Therefore, the total number of wires in the bus to each chip, $b_i$, must be $$b_i \geq IO_i$$

and, for the entire board, there must be at least B wires on the board, where $$B \geq \sum_{i}^{n}(bi+3)$$

and the additional wires are for communications with the chip and the randomizing data to the chip. Any additional bus connections on the board are used as cryptonulls, routing random, meaningless, data to a chip in order to complicate reconstructing the circuit.

At the Crossbar, signals are routed from their source to the appropriate destination over one of the bus wires connected to the correct chip from the Crossbar. At irregular intervals, the signal mapping for each I/O function is changed. The assignments, or mappings, comprise the state of the circuit connection at any time. The period that a state is valid is determined by applying a reseeding function to a portion of a randomized stream that calculates the next state and the duration of validity.

Figure 7:
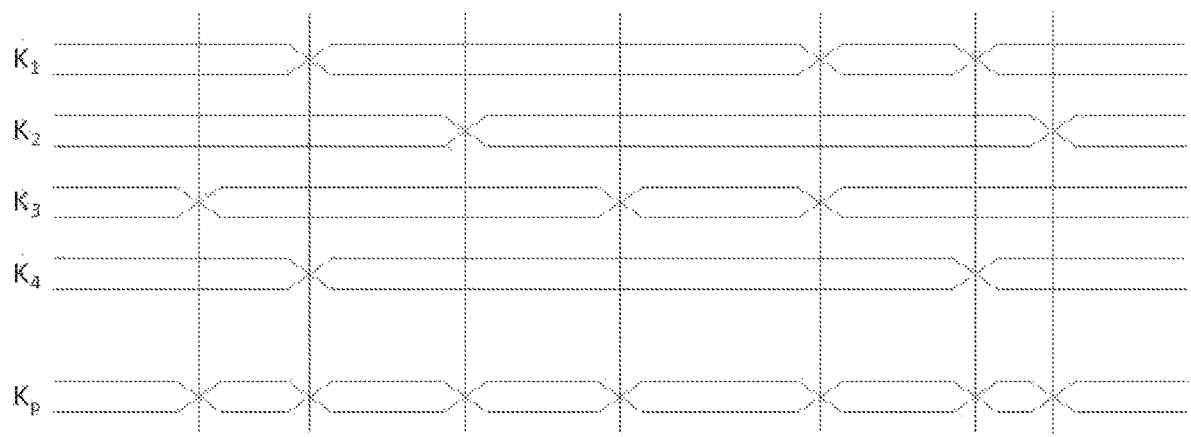
FIG. 7 is a graphic depiction of the use of multiple seeds or keys to alter the states of a circuit.

As shown in FIG. 7 Multiple seeds, or keys, are used to create the states. Because each key changes independently of the other keys and without notice, the time interval for a valid state is greatly reduced, complicating any effort to reveal the internal states of chips.

DPR has two main applications: speeding development of a circuit, and circuit security.

Any circuit can be quickly prototyped and produced by implementing the circuit in programmable chips that have the DPR circuitry installed, subject to having enough pins available for the I/O requirements of each individual chip. Any chips that are unused can be depopulated on the board for minimizing the cost of implementation. Having a small set of standard boards that can be mass produced and kept in inventory greatly reduces overhead costs for the first implementation of circuitry. If a product proves successful enough to warrant customized boards, then a second design round can be followed as needed.

The second application is securing a circuit. LR is particularly useful where the hardware does not maintain the same connections and configuration, it is much more difficult to reconstruct the circuit. DPR increases the number of connections (c) for each chip (n) to
A brute force attack requires an average of ½ a guesses, a very large number as S increases.

$$c = \prod_{i=1}^{n}\left(\frac{w_i}{IO_i}\right)$$

where $w_i$ are the number of wires to/from the chip (i), and $IO_i$ are the required number of I/O signals for the chip (i). Further, with proper randomization, the selection changes for every time slot (s) as an independent random variable (IRV). For the length of operation, the number of possible assignments (a) for the circuit I/O is $$a = \prod_{s=1}^{m} c_{ms} = \prod_{s=1}^{m}\left(\prod_{i=1}^{n}\left(\frac{wi}{IO_i}\right)_s\right)$$

which increases multiplicatively. With no pseudo random number generation, the only choice for sorting the possible states by brute force attack. A brute force attack requires an average of ½ a guesses, a very large number as s increases. In addition to the large number of possibilities, an attacker must know the results from every input/output pair in order to be able to reconstruct the circuit. Missing data from even a single time period renders circuit reconstruction impossible. Such a large number of possibilities make it difficult, if not impossible, to reverse engineer the circuit. The virtualization aspect of a VFPGA adds another dimension to the problem making even more complex.

This is important because digital circuits are composed of a set of states and transitions and if the set is finite, then it is possible to reconstruct the circuit by observing the outputs from the circuit given a known input sequence. This is a problem if you were to implement a cipher directly into a static chip configuration—it could be reverse engineered by a competitor, or a hacker. If the layout of a circuit is on a printed circuit board (PCB), those layouts are static as are the encoding of the states, I/O definitions, and transitions of the circuit.

From a manufacturing perspective, PCB design is only partially automated, with each layout manually customized for the circuitry of the board, thus, incurring a non-recoverable engineering (NRE) charge for each circuit. Each change to the circuit result in a new PCB layout and each incurs an additional NRE. Developing boards is costly and time intensive, a significant portion of the development budget and time line.

CipherLoc's Virtual FPGA Polymorphic Hardware Engine on an NFPGA chip/set uses LR and DPR to implement its polymorphic hardware solution and is as secure as a polymorphic key progression algorithm (PKPA) on an FPGA chip.

Advantages of Virtual FPGA Polymorphic Hardware functionality on NFPGA chips/sets:

1. Prevents reverse engineering of novel circuitry.
2. Can be used to ensure variability from use to use, such as for encryption.
3. Makes state retention and recovery impossible,
4. With virtualization, DPR provides even better security against circuit re-engineering because:
   a. The circuit layout is dynamic,
   b. Chip functionality is not readily identified by markings, I/O number, or other physical identifiers,
   c. The initial state of the circuit is not the same each time power is applied,
   d. System configuration does not depend on data provided by a user. No password or key is known by a human and cannot be compromised,
   e. Uses entropy and unicity distance to ensure security, and
   f. Relies on a polymorphic randomization.
   g. because one cannot reverse engineer the layout and cannot be state analyzed easily
5. The layout of the board is simplified, resulting in
   a. Reduced prototyping costs due to lack of:
     i. Custom design for board
     ii. Iterative board changes
     iii. Wasted time while the board is being fabricated
     iv. Purchase and delivery of required chips
     v. Board fabrication costs
   b. Board reuse. Custom testing boards are no longer necessary, eliminating waste on the bench, the storage of old designs, and the security risk of reverse engineering from lab waste.
   c. No custom design unless realizing a cost reduction or performance enhancement. After the need for security is past or after it is determined that the sales of a design warrant cost reductions for economies of scale, a custom layout may still be performed. Expenses related to prototyping a PCB circuit can be deferred until after the product supports the outlay.

d. Speeds prototyping. Off the shelf boards can be kept in stock and immediately used. There is no wait for boards to be designed, checked, fabricated, and stocked. Each round of design and development incurs the same penalty. Pre-manufactured boards can cut delay out of the vital time-to-market time period. Using a DPR circuit gives an edge to the company that does require custom board design to release product.

The invention claimed is:

1. A printed circuit board having at least one non field programmable gate array micro processor chip wherein said chip is configured using firmware such that a shared memory is created by a non-persisted memory mapping function, said shared memory being in the form of a look up table: wherein the transfer function of a circuit within a field programmable gate array chip is simulated by partitioning a sufficiently large amount of memory having memory addresses into different blocks corresponding to different circuits represented by the transfer function in a portion of the memory and wherein indexing to the memory addresses and using the contiguous memory for a look up table corresponds to loading a field programmable gate array chip and its internal fabric configuration as if it were a new circuit.

2. The printed circuit board according to claim 1 wherein said shared memory comprises a sequence of digital signals that can be represented/implemented by a finite state machine.

* * * * *